Figure 1:
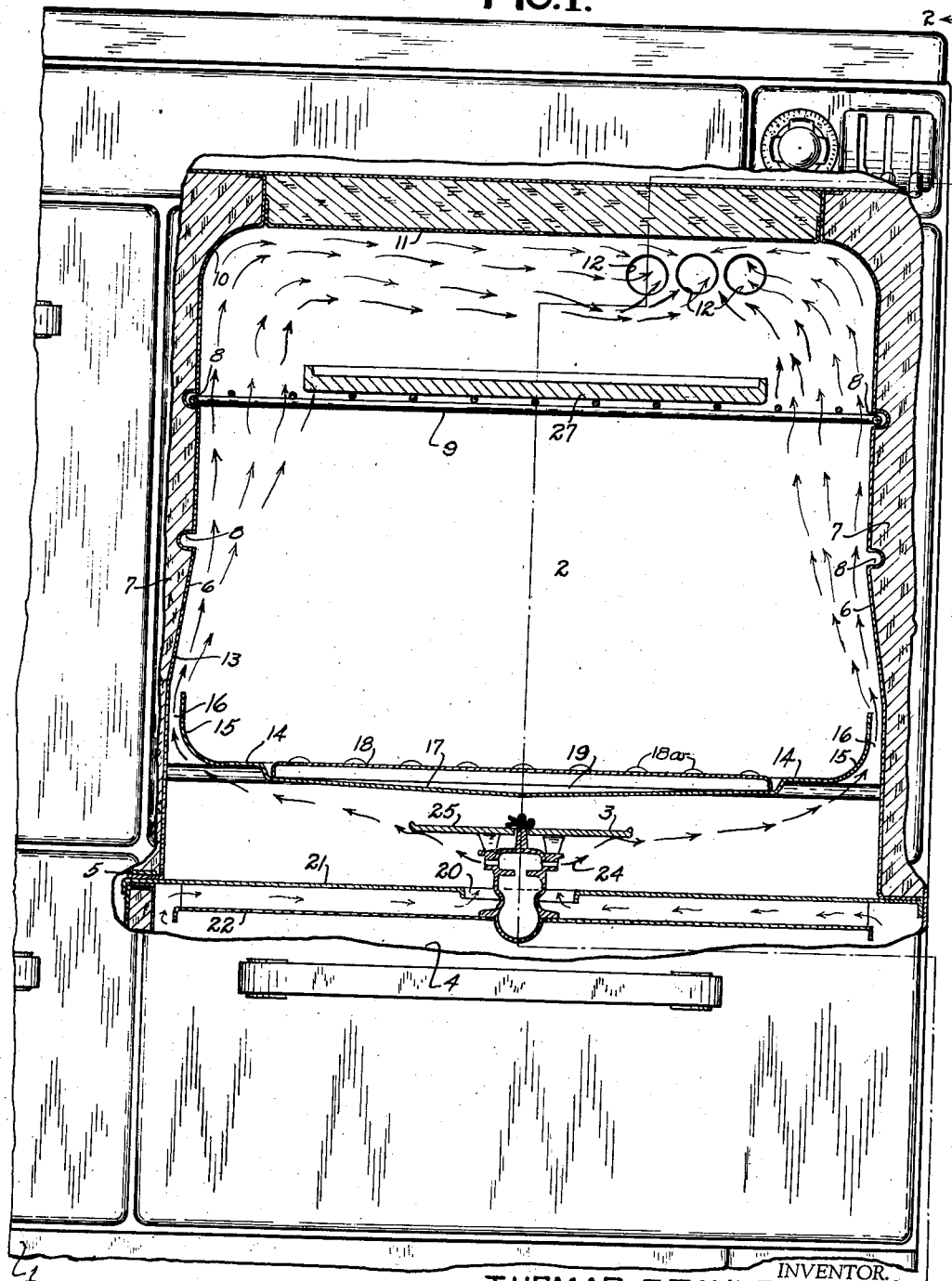

May 30, 1939.     T. E. TAYLOR     2,160,764
OVEN FOR DOMESTIC RANGES
Filed Aug. 25, 1937     2 Sheets-Sheet 1

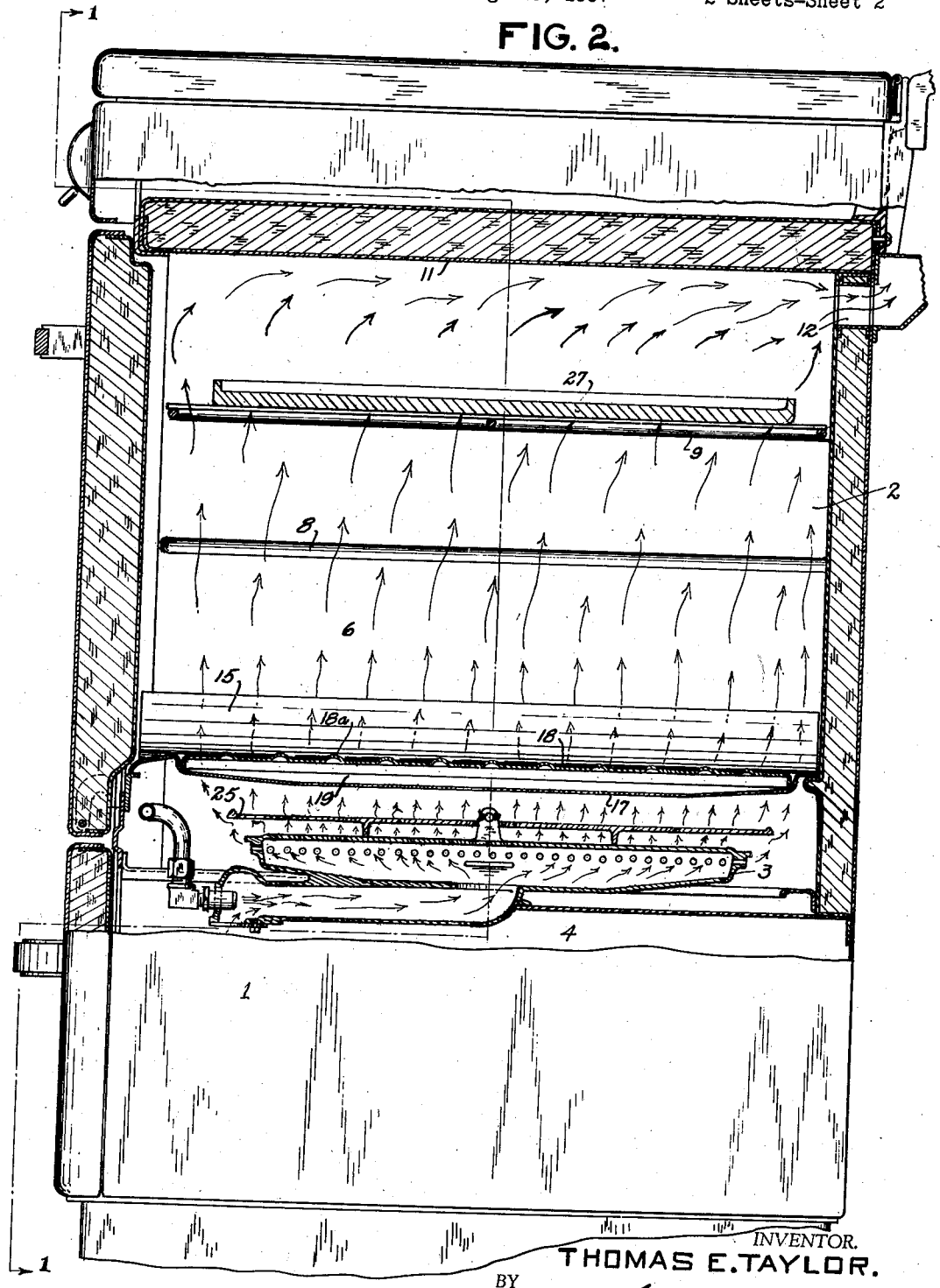

Patented May 30, 1939

2,160,764

UNITED STATES PATENT OFFICE 2,160,764

OVEN FOR DOMESTIC RANGES

Thomas E. Taylor, Cleveland, Ohio, assignor to The Cleveland Cooperative Stove Company, Cleveland, Ohio, a corporation of Ohio.

Application August 25, 1937, Serial No. 160,842

5 Claims. (Cl. 126—273)

This invention relates to household cooking ranges and particularly to a new and improved oven construction.

One of the principal objects of the present invention is to provide in a gas or electric cooking range, an oven, burner or heating element, and tray so related that the heat from the burner or heating element, when it is located below the oven, is directed to the top wall of the oven initially and before any appreciable heat is transferred to the side walls or interior surface of the oven floor.

Another object is to provide an oven in which a temperature sufficient for broiling and rapid cooking is maintained near the top wall of the oven and without exposure of the burner flame in the oven and so that such cooking can be effected by the operator while standing on the floor level and bending or stooping rendered unnecessary.

A more specific object is to provide an oven and removable tray so related to the burner that broiling of meats simultaneously on both sides may be accomplished and uniform application of the heat to the meat maintained at all times.

Another specific object is to provide an oven and lining wall having channels formed therein and extending fore and aft of the oven for the reception of the usual grill shelves whereby the flow of heat along the side walls toward the top wall is not impeded or retarded in any manner, such as by the usual shelf guides.

Other objects and advantages will become apparent from the following specification, wherein reference is made to the drawings, in which Figure 1 is a fragmentary front elevation of a gas range embodying the principles of the present invention, the oven compartment being shown in section for purposes of illustration, as indicated by the line 1—1 of Figure 2.

Figure 2 is a vertical cross-sectional view taken on a plane indicated by the line 2—2 in Figure 1.

Referring to the drawings, the invention is shown for purposes of illustration as embodied in a domestic gas cooking range though it is equally applicable to an electric range. The range, designated generally as 1, has an oven compartment 2 with a burner 3 arranged thereunderneath, the usual removable drawer being provided below the level of the burner. The oven compartment is provided with the usual outer walls 5 and inner side walls or liners 6, insulating material, indicated at 7, being provided between the outer walls and the liners 6. In each of the liners 6 are grooves 8 which extend fore and aft of the oven compartment 2 and receive the lateral margins of the usual wire or grill shelves 9 for slidably accommodating the trays in the compartment. The inner faces of the liners 6 are otherwise unbroken and smooth and at their upper limits they merge on a gradual curve, indicated at 10, with the inner top wall 11 of the oven. Suitable exhaust vents 12 are provided at a suitable location such as the rear wall of the oven compartment. Near their lower limits the liners 6 have portions 13 which flare outwardly at a very slight angle to the vertical, as illustrated. The floor or bottom wall of the oven comprises a sheet metal shield 14 substantially coextensive with the oven compartment fore and aft thereof. At its lateral margins the shield 14 is provided with upturned flanges 15 which lie in slightly spaced relation to the portions 13 of the liners 6 and define upwardly directed passages 16. The shield 14 is provided with a central depression 17 which accommodates a tray 18, the margins of which are turned downwardly so as to space the bottom of the tray substantially on the level of the lateral portions of the bottom of the oven. The tray 18 is provided with small protuberances 18a which support cooking receptacles in a manner such that cooking, even baking of breads, pies, and the like, may be practiced directly on the oven floor without danger of scorching. Thus the usual practice of supporting utensils, for the baking of pastries, on grills or shelves spaced considerably above the floor of the oven is unnecessary. By virtue of the spacing of the shield 14 and tray 18, an air pocket 19 is formed therebetween, which prevents concentration of the heating on the bottom wall of the oven and insulates the tray 18 from the direct application of heat from the burner or heating element 3. The oven compartment beneath the shield 14 is sufficiently large and open to permit a ready flow of the heat and heated products of combustion from the burner or heating element 3 upwardly through the passages 16. Due to the upward slope of the bottom of the depression 17 and the outward flaring of the liner portions 13, the heated air and products enter the oven compartment through the passages 16 and are directed upwardly to the top wall 11 of the oven near the lateral margins thereof. In this manner the heat is concentrated at the oven top wall and the zone between the oven top wall and the top shelf 9. In the case of a gas burner, secondary air for sustaining combustion may be supplied to the burner from the room floor level, the secondary air entering the drawer 4 and passing upwardly through the opening 20 in the horizontal partition wall 21 between the oven compartment and the drawer. A supplementary partition wall 22 is provided beneath the partition wall 21 in spaced relation thereto so that the necessary air flows between the walls and thus air-washes the same and prevents heating of the drawer 4 by the burner or heating element 3. In case of a gas burner, the gas is preferably discharged laterally and substantially horizontally beneath the oven compartment, as indicated by the arrows 24, and a deflecting shield 25 is positioned above the burner so as to assure as direct a passage as possible of the heated products of combustion to the passages 16.

For cooperating with the burner and oven described, there is provided a broiling or grilling tray 27 which is preferably of aluminum or aluminum alloy or of a material having a high heat conductivity. The tray is preferably of a moderately thick aluminum casting, the upper surface of which is flat except for very slight flanges about the margins thereof. When meat is placed on the tray 27, substantially the entire under surface of the meat is in direct contact with the aluminum tray. Usually a number of trays 27 are provided, each of the trays being different in area from the others. The tray chosen for a particular meat should be substantially the same in horizontal surface area as the juxtaposed face of the meat. In operation, the meat to be grilled is placed on the tray while the tray is unheated and arranged to substantially entirely cover the particular tray. The meat is then pressed lightly against the upper surface of the tray to provide as uniform contact as possible between the meat and the tray. In this condition, the tray is slid onto the shelf 9 in the heated oven compartment 2, which at the time is heated to a temperature of about 450° F. at the level of the shelf 9. By following this practice, the meat becomes grilled uniformly on both its upper and lower surfaces concurrently and to substantially the same degree.

The operation appears to be due to several phenomena. First, the heat from the heating element or burner 3 is directed initially against the top wall of the oven compartment and is concentrated at the top wall whereby it is reflected downwardly onto the upper surface of the meat. At the same time, direct application of intense heat to the under surface of the tray 27 is prevented by the pocket 19. Consequently, the heat reaching the under surface of the meat must be by conduction of heat thereto through the metal tray 27 itself. Due to the rapid heat conduction and dissipating qualities of the tray, sufficient heat is applied to the under surface of the meat to provide a temperature equal to that of the upper surface. The importance of placing the meat on the tray 27 while the grill is cool or unheated is evidenced by the fact that if the tray is initially heated preparatory to placing the meat thereon, the meat will tend to become grilled excessively on the under suface, and particularly near the edges of the under surface. This apparently results from the building up of the heat in the tray to a temperature beyond which the tray cannot conduct and dissipate the heat rapidly even with the meat on the tray and providing an absorbent for the heat. At no time should the heat entering the tray exceed the rate at which the heat is dissipated by the tray and absorbed by the meat. If the tray is initially unheated and fits the meat, it can dissipate heat as fast as the heat is absorbed by its margins from the heated products in the upper part of the oven and thus maintain a balance. With the tray initially heated, though the same rate of conduction and dissipation of heat will be maintained, the rate of absorption and the resultant temperature at the margins of the tray will always be in excess of the central portion and may reach a temperature which burns the edges of the meat. Again, if the meat does not entirely cover the tray, the uncovered, exposed tray surfaces absorb heat too rapidly to be quickly dissipated and these exposed areas reach a scorching temperature themselves and also cause the remainder of the tray to accumulate heat to too great a degree.

Care must be taken, also, as heretofore explained, to provide smooth side walls or liners, as overhanging brackets and the like obstruct the direct flow of heat from beneath the oven to the top wall thereof. Furthermore, care must be taken that the heat from the burner is not deflected directly against the under side of the tray, as such action would cause an excess heating of the tray to an extent beyond which the tray could not dissipate the heat.

In such grilling of meat, it is found that the liquid content in the meat is retained and none of it dissipated as smoke, steam and the like, as the moisture is held at a lower temperature, not only due to the lower temperature of the tray and oven, but also due to the immediate absorption of the heat by the meat.

Having thus described my invention, I claim:

1. In an oven comprising top, rear, bottom and side walls, said side walls having portions in the form of horizontal grooves extending fore and aft of the oven for receiving and supporting a shelf, heating means disposed below the bottom wall, and means at the lateral limits of the bottom wall cooperating with the inwardly exposed side walls of the oven compartment for directing heated media from the heating means along the inwardly exposed surfaces of the side walls, upwardly to the top wall of the oven compartment and in spaced relation to the mid-portion of the oven compartment.

2. An oven comprising a compartment having inner side walls, a top wall, and a bottom wall, the side walls sloping outwardly slightly at their lower portions above the bottom wall and being spaced laterally short distances from the lateral margins of the bottom wall, the lateral margins of the bottom wall extending upwardly and defining with the sloping portions of the side walls passages for heating media and for directing such media upwardly along the sloping surfaces directly to the top wall of the oven near the lateral margins thereof, heating means disposed centrally beneath the bottom wall, and means carried by the bottom wall in overhanging relation to the heating means for reducing the admission of heat into the oven through the bottom wall.

3. A broiling oven comprising a closed oven compartment having top, side, rear and bottom walls, an exhaust vent in one of said walls near the upper limit of the compartment, heating means disposed below the bottom wall, said bottom wall and side walls being configured to direct heating media from the heating means directly to the lateral margins of the top wall of the oven compartment, a tray of relatively high heat conducting and dissipating qualities with its side edges disposed sufficient distances away from adjacent side walls of the compartment to provide free passages for such heating media past such edges, the tray having a substantially flat upper surface and being disposed in the upper portion of said oven compartment, and means carried by the bottom wall in alignment vertically with the heating means for reducing the transfer of heat from the heating means through the bottom wall.

4. A broiling oven comprising a closed oven compartment having top, side, rear and bottom walls, an exhaust vent in one of said walls near the upper limit of the compartment, a burner disposed below the bottom wall and constrained from exposing the flame in the oven compartment, said bottom wall and side walls being configured to direct heating media from the burner upwardly, and directly to the lateral margins of the top wall of the oven compartment, and a tray of relatively high heat-conducting and dissipating qualities and having a substantially flat upper surface and disposed in the upper portion of said oven compartment in sufficiently spaced relation to said side walls so that the upwardly directed heating media is not materially deflected from upward travel by the tray.

5. A broiling oven comprising a closed oven compartment having top, side, rear and bottom walls, an exhaust vent in one of said walls near the upper limit of the compartment, a burner disposed below the bottom wall and constrained thereby from exposing the flame in the oven compartment, said bottom wall and side walls being configured to direct heating media from the burner upwardly from the lateral margins of the bottom wall directly to the lateral margins of the top wall of the oven compartment, a tray of relatively high heat-conducting and dissipating qualities and having a substantially flat upper surface and disposed in the upper portion of said oven compartment, and said top and side walls merging at the lateral margins of the top walls on a gradual curve for assisting the flow of heating media along the top wall.

THOMAS E. TAYLOR.